W. NELSON.
BELT SHIFTER.
APPLICATION FILED OCT. 14, 1919.
1,359,909.
Patented Nov. 23, 1920.
7 SHEETS—SHEET 5.
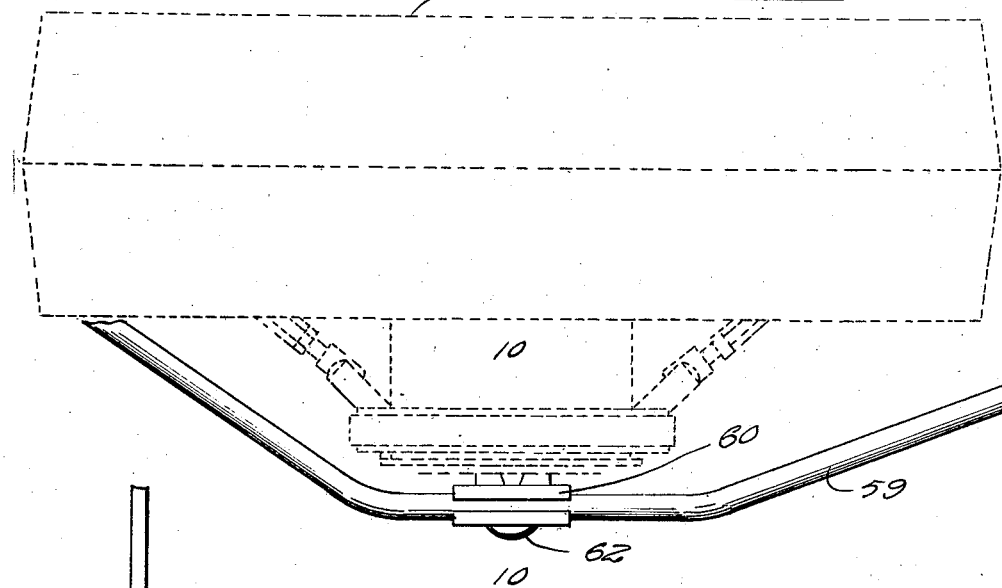
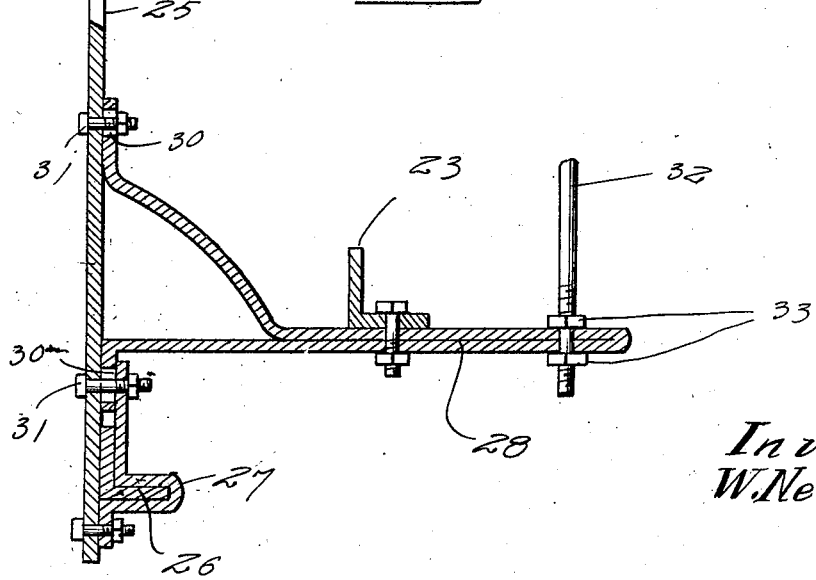
Inventor
W. Nelson W. NELSON.
BELT SHIFTER.
APPLICATION FILED OCT. 14, 1919.
1,359,909.
Patented Nov. 23, 1920.
7 SHEETS—SHEET 6.
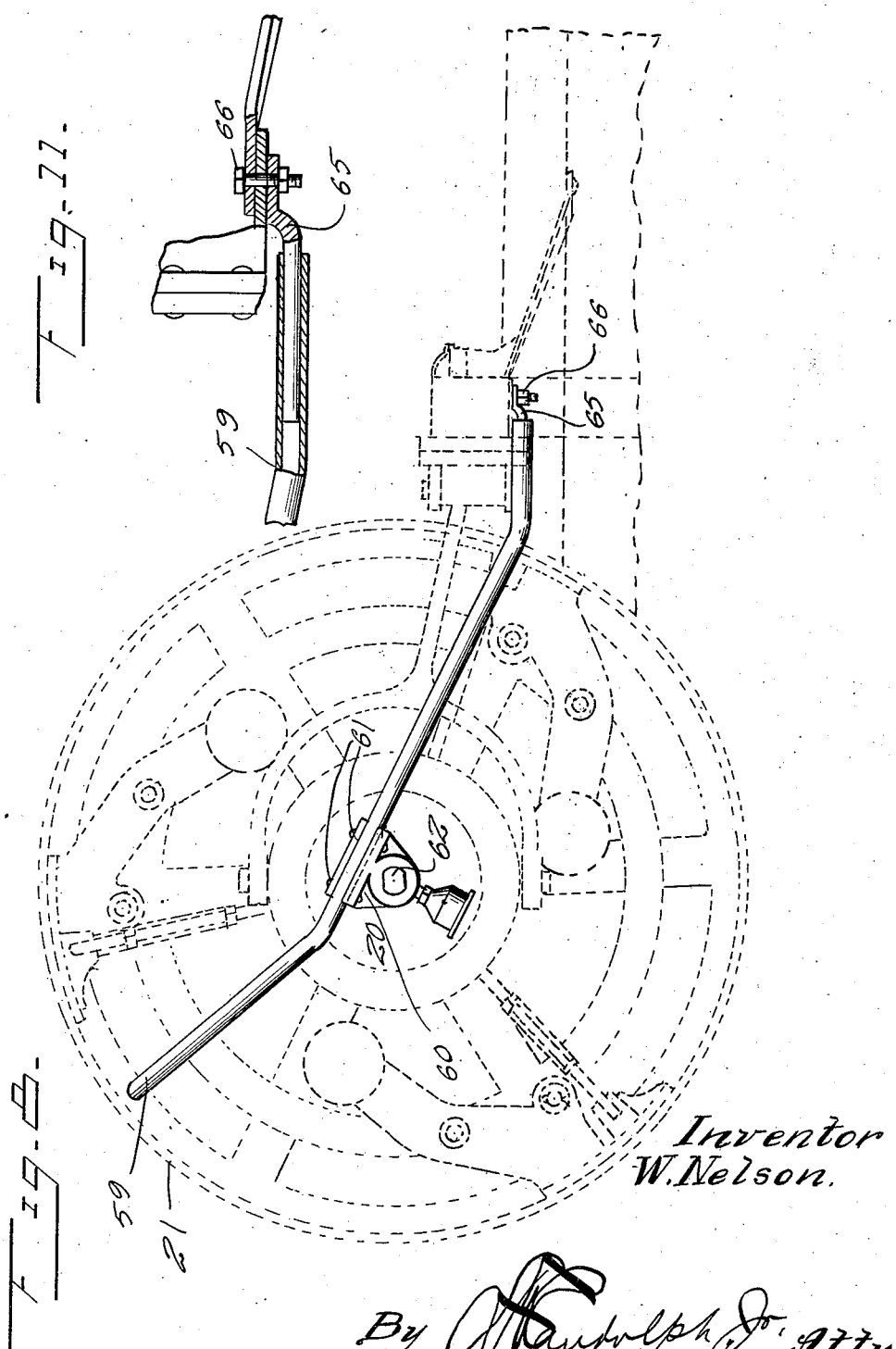
Inventor
W. Nelson.
By [signature], Atty

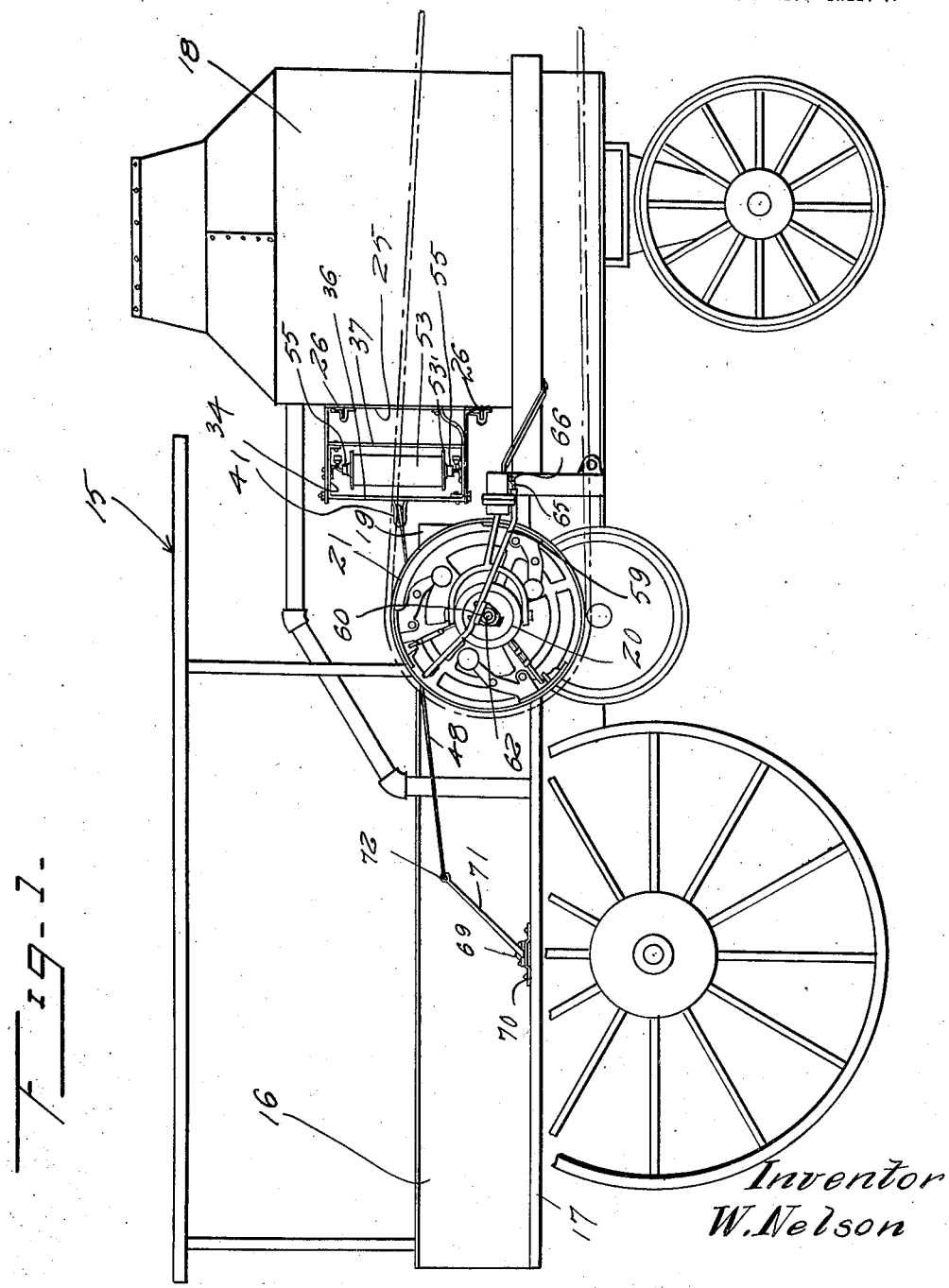

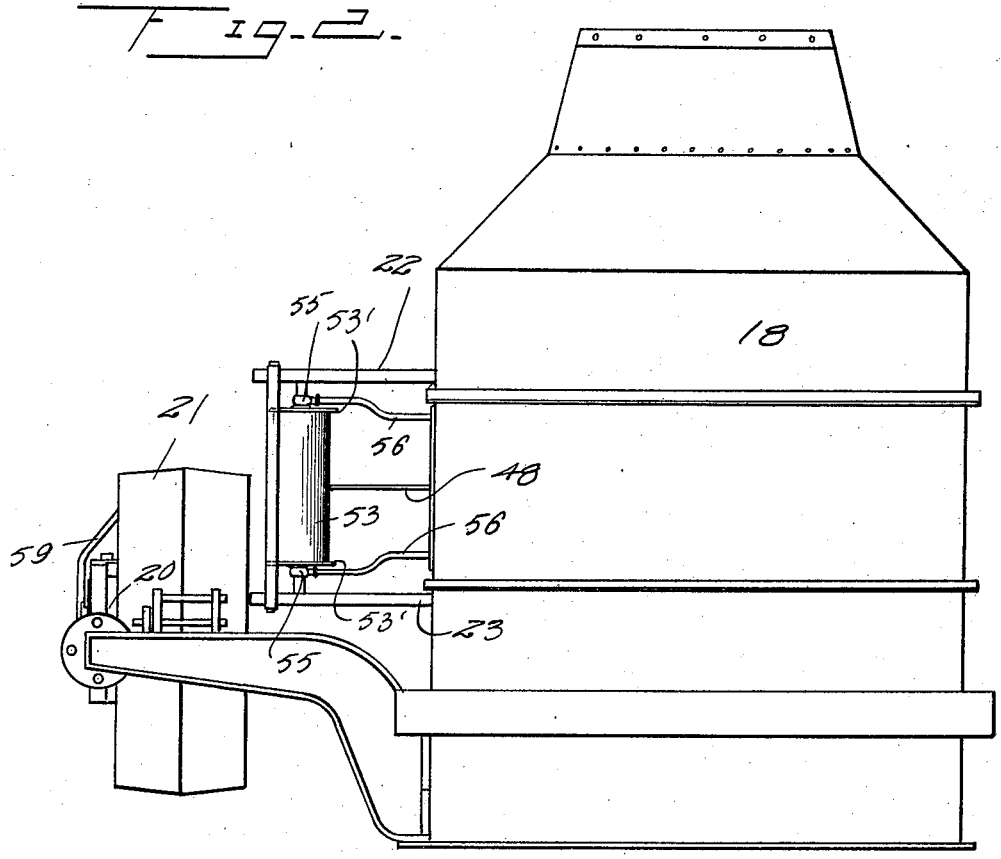
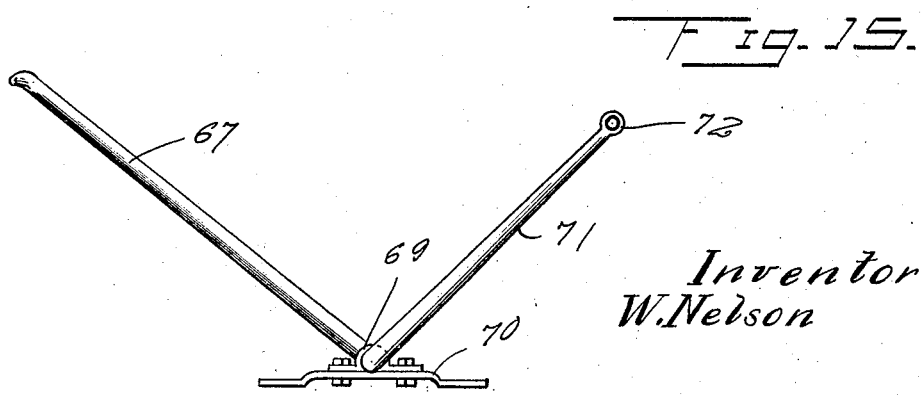

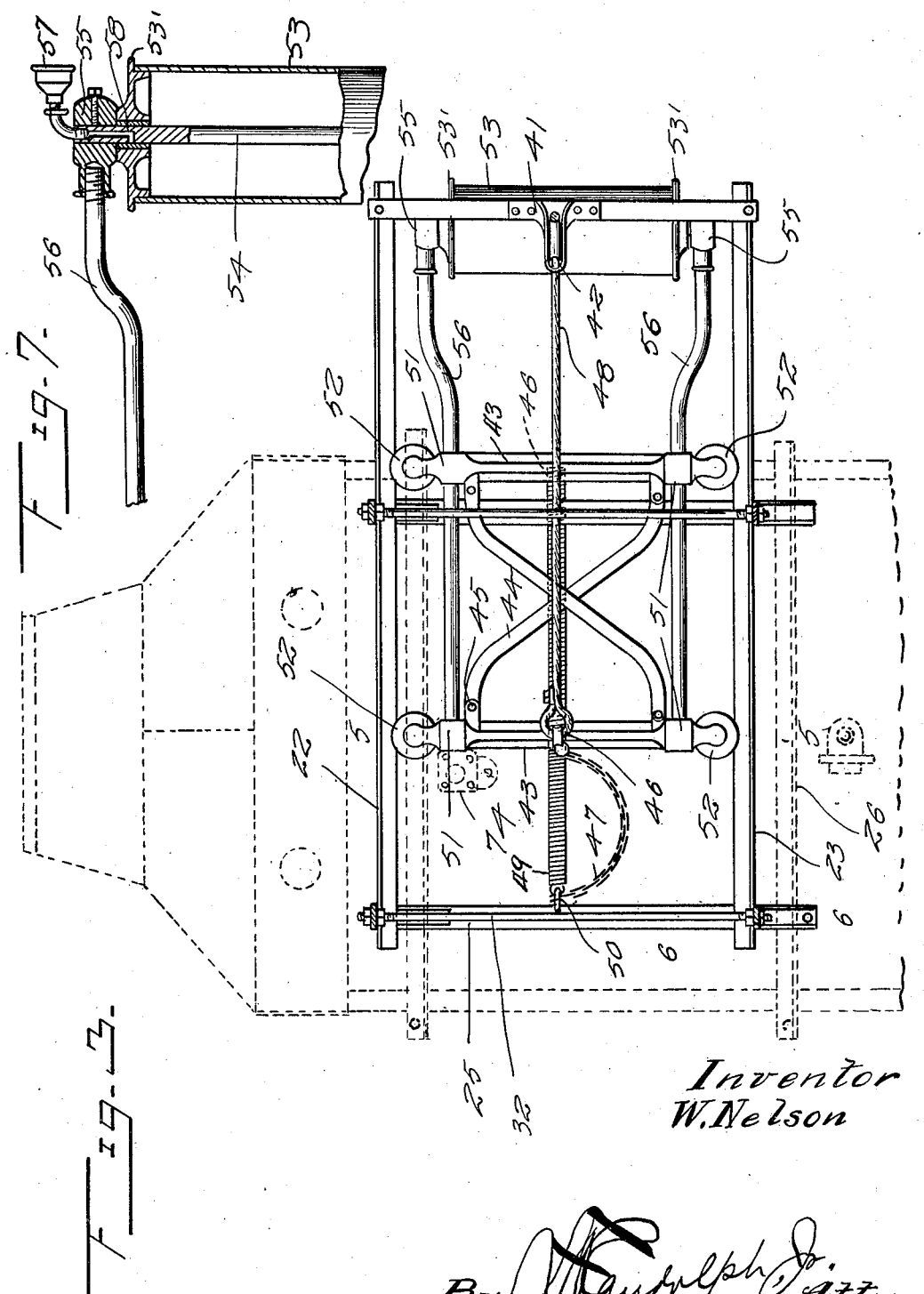

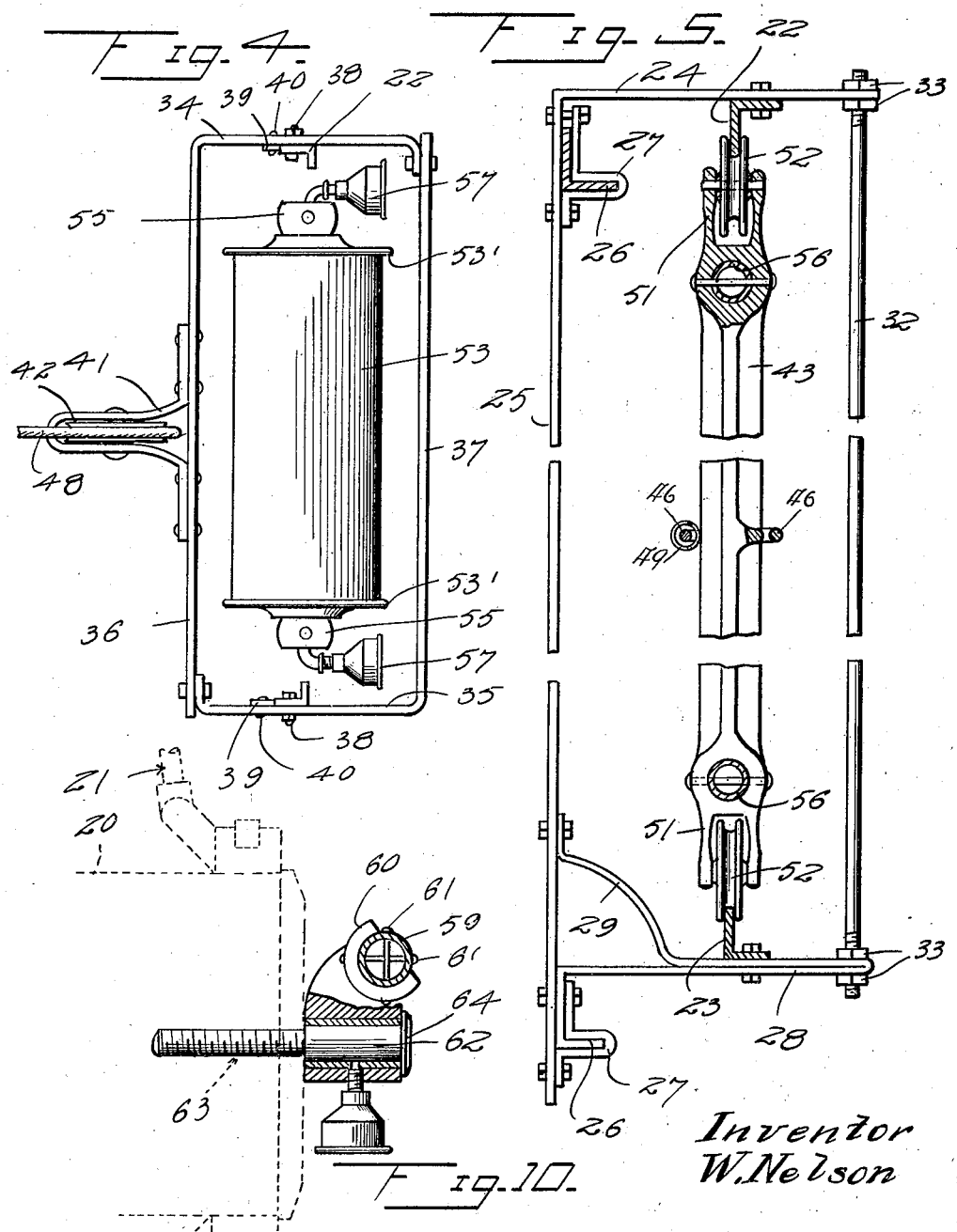

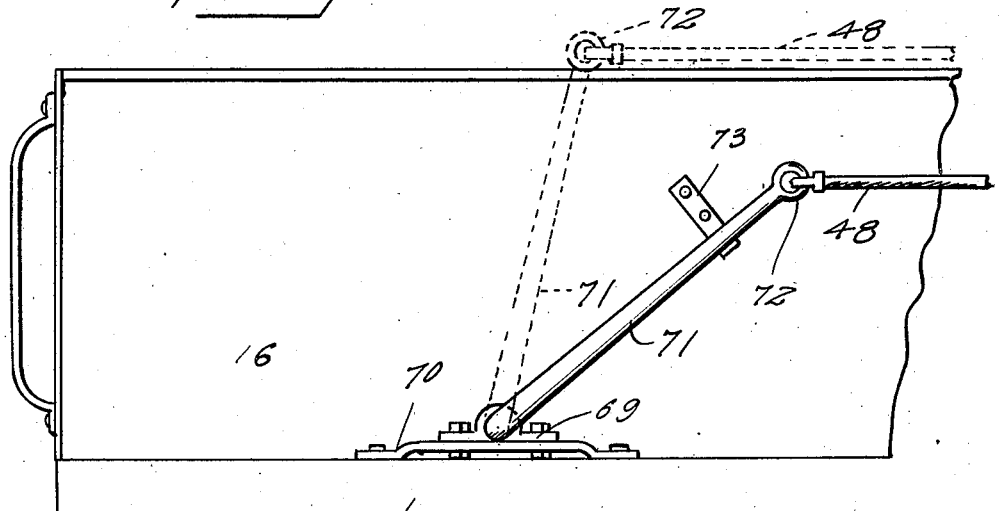
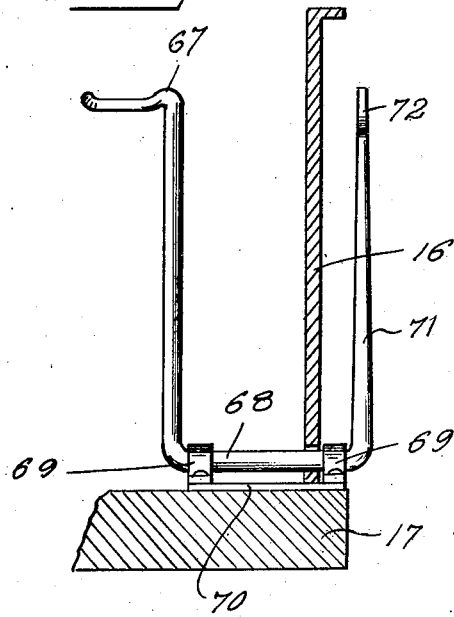
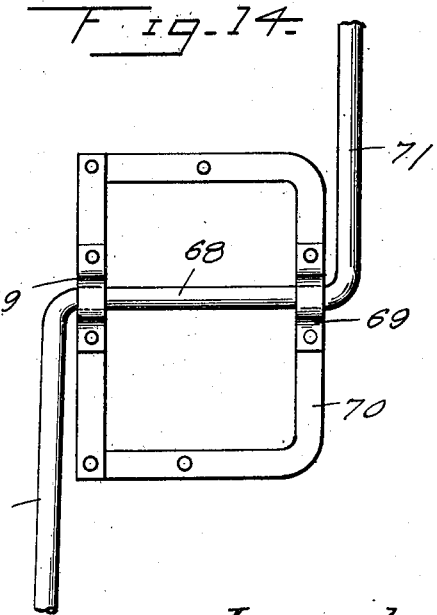

UNITED STATES PATENT OFFICE.

WALTER NELSON, OF OSLO, MINNESOTA.

BELT-SHIFTER.

1,359,909.             Specification of Letters Patent.     Patented Nov. 23, 1920.

Application filed October 14, 1919. Serial No. 330,637.

*To all whom it may concern:*

Be it known that I, WALTER NELSON, a citizen of the United States, residing at Oslo, in the county of Marshall and State of Minnesota, have invented certain new and useful Improvements in Belt-Shifters; and I do hereby declare the following to be a full, clear, and exact description of the invention, such as will enable others skilled in the art to which it appertains to make and use the same.

This invention relates to an improved belt shifter and one object of the invention is to provide a shifter so constructed that it may be associated with a tractor such as is commonly used in farm work for running threshing machines and the like, the shifter being so constructed that it may serve to prevent the belt from slipping off of the pulley carried by the engine shaft as well as serving as means for moving the belt off of the pulley.

Another object of the invention is to so construct this shifter that it may be slidably mounted upon a track and yieldably retained in inoperative position, improved means being provided for moving the shifter into engagement with the belt for moving the belt off of the pulley.

Another object of the invention is to so construct the shifter that it may be restricted in its movement thus preventing it from being damaged by improper use.

Another object of the invention is to so construct the carriage and track upon which the carriage moves that there will be no danger of the carriage moving out of engagement with the track when the shifter is in use and moving to or out of an operative position.

Another object of the invention is to provide improved track construction, the track being so constructed that it may be connected with the angle bars usually provided in connection with the radiator of the tractor.

Another object of the invention is to provide improved actuating means for this belt shifter, the actuating means being mounted in connection with the flooring of the cab portion of the tractor.

Another object of the invention is to provide an improved pulley guard which will prevent the belt from becoming entangled with the pulley when the belt is moved out of engagement with the pulley by the shifting means.

Another object of the invention is to so construct this device that it will be simple to operate, easy to assemble, and not liable to readily get out of order or break.

This invention is illustrated in the accompanying drawings, wherein:

Figure 1 is a side elevation of a tractor provided with the belt shifting device, the upper portion of one of the ground wheels being broken away to show the mounting of the actuating means.

Fig. 2 is a front elevation of the tractor with the attachment in place and in an inoperative or retracted position.

Fig. 3 is a view showing the attachment in elevation.

Fig. 4 is an end elevation of the attachment.

Fig. 5 is a vertical section taken along the line 5—5 of Fig. 3.

Fig. 6 is an enlarged section taken along the line 6—6 of Fig. 3.

Fig. 7 is an enlarged section through the upper portion of the roller mounting.

Fig. 8 is an enlarged elevation of the pulley showing the guard associated therewith.

Fig. 9 is a top plan view of the wheel attachment.

Fig. 10 is a section taken along the line 10—10 of Fig. 9.

Fig. 11 is an enlarged detail view showing the fastening means for the guard rod shown in Fig. 8.

Fig. 12 is a side elevation of the actuating lever.

Fig. 13 is an end elevation of the actuating lever.

Fig. 14 is a top plan view of the actuating lever.

Fig. 15 is a side elevation of the actuating lever.

This belt shifter is used in connection with a traction engine indicated in general by the numeral 15 and having a cab 16 provided with a flooring 17. A radiator 18 is provided at the forward end of the traction engine and positioned in front of the engine 19, the shaft 20 of which carries a pulley wheel 21. The structure so far described is of a conventional construction and therefore is not described in detail.

The track is positioned in back of the radiator 18 and extends transversely of the traction engine, as shown clearly in Fig. 3. This track is provided with upper and lower rails 22 and 23, the upper rail being secured to the arms 24 of the vertical supporting bars 25 which extend between the radiator and the angle irons or cross bars 26 and are connected therewith by the clamps 27. Arms extend from the lower cross bars 26 and are bent to provide brackets 28 which carry the lower rail 23 and are provided with extensions or braces 29 which are connected with the bars 25 as shown clearly in Figs. 5 and 6 thus preventing the brackets from bending under the weight of the carriage which will be hereinafter described. From an inspection of Fig. 6 it will be readily seen that the ends of the bars or strips which form the brackets 28 are provided with enlarged openings or slots 30 through which the bolts or other adjustable fasteners 31 pass thereby permitting these brackets to be vertically adjusted and thus permit the rails 22 and 23 to be positioned the proper distance apart. Bracing rods 32 connect the outer ends of the arms 24 and brackets 28 to retain the brackets in proper spaced relation to the upper arms and in addition serve as supporting and bracing means for the brackets. Securing nuts 33 are screwed upon these rods above and below the arms 24 and brackets 28 so that the rods will be held in tight engagement with the arms and brackets. It should be noted that the rails 22 and 23 extend beyond the radiator as shown in Fig. 3 and in Fig. 2, thereby permitting the carriage to be moved the desired amount as will be hereinafter brought out. The outer end portions of the rails are secured to the arms 34 and 35 of the vertical bars 36 and 37 by bolts 38. Abutment blocks 39 are secured to these arms in engagement with the rails by means of rivets or other permanent fasteners 40 so that the frame formed by these bars as shown in Fig. 4 may not have pivotal movement upon the rail. A bearing bracket 41 is secured to the vertical bar 36 and carries a pulley 42. It will thus be seen that this frame or track will be very strongly constructed and may be rigidly held in engagement with the cross bars 26 but at the same time will be permitted of adjustment so that it will have proper engagement with the carriage.

The carriage is slidably mounted upon the track between the rails 22 and 23 and is provided with standards 43 which are connected by the diagonally extending X-shaped braces 44 which are secured to ears 45. Each of these standards carries an eye 46, the eye of one standard being engaged by the chain 47 and cable 48 which passes about the pulley wheel 42 and the eye of the second standard being engaged by the spring 49. The spring 49 and chain 47 are connected with the innermost vertical bar 25 through the medium of the shackle 50 and it will thus be seen that this carriage will be limited in its movement under pull of the cable 48 by the chain 47 and may be returned to the position shown in Fig. 3 by the spring 49. The upper and lower end portions of the standards are formed into bearing brackets 51 in which are mounted rollers 52 which engage the rails 22 and 23 thereby permitting the carriage to move easily. By proper adjustment of the frame or track structure, the rollers may be caused to have proper engagement with the rails thereby preventing the carriage from jumping the track but at the same time permitting it to have easy sliding movement.

This belt shifter is provided with a roller 53 which is mounted upon a vertical shaft 54 carried by the head 55 at the outer end of the hollow supporting bar or pipe 56 and extending through and rigidly secured in openings formed in the upper and lower end portions of the standard 43. Grease cups 57 are provided so that grease or other lubricant may be fed through the oil ducts 58 to the bearings formed in the head 53' of this roller. It will thus be seen that the belt shifter may engage the belt which passes about the pulley 21 without undue friction which might tend to curl the belt. From an inspection of Fig. 2 it will be readily seen that when the shifter is in the normal position the roller is positioned adjacent the inner edge of the belt and therefore if the belt moves transversely toward the traction engine or in other words toward the inner edge of the pulley 21, it will engage the roller and be prevented from slipping off of this side of the pulley. Therefore it cannot slip off of the pulley and drop down between the pulley and the body portion of the traction engine and motor. This prevents the belt from being torn and otherwise damaged.

In order to prevent the belt from being caught in the pulley and thus damaged when shifted off of the pulley by this belt shifter, there has been provided a guard bar 59 which is curved longitudinally as shown clearly in Figs. 8 and 9 and rests in the clamp 60 where it is secured by rivets or other rigid fasteners 61. This clamp is carried by a stub shaft 62 which is screwed into a threaded socket 63 formed in the driving shaft of the motor, the stub shaft being provided with an enlarged head 64 at its outer end so that the clamp will not be liable to slip out of place. This stub shaft may rotate freely in the bearing of this clamp thereby permitting the pulley and shaft 20 to rotate with the guard bar remaining stationary. One end of this guard bar is left free as shown in Fig. 8 but the other end fits upon the supporting stem 65 which is secured through the medium of the bolt 66 and it will thus be seen that the guard bar will be secured in the proper position.

In order to shift the carriage and thus extend the same outwardly as shown in Fig. 2, there has been provided a treadle 67, the shaft 68 of which is mounted in bearings 69 carried by the brackets 70 and extends through the wall of the cab of the engine and is then bent to provide a lever 71 which extends upwardly and terminates in an eye 72 in which is secured the cable 48. An abutment 73 is provided upon the wall of the cab so that swinging movement of this lever under pull of the cable 48 and spring 49 will be limited. It will therefore be seen that the carriage cannot be moved inwardly beyond the position shown in Fig. 3. It should be noted in this connection that the carriage is preferably mounted so that when it moves inwardly it will be limited in its movement by the inlet coupling 74 of the radiator and thus prevented from moving inwardly beyond the desired amount in case the cable should stretch or slip.

When this belt shifter is in use it is assembled as shown and connected with the traction engine as disclosed in the drawings. Under ordinary circumstances it will remain in the position shown in Fig. 3 and will serve to prevent the belt from slipping off of the pulley and falling between the pulley and the body of the traction engine. When it is desired to remove the belt it is simply necessary to place the foot upon the treadle 67 and press this treadle or lever downwardly thus swinging the lever 71 upwardly to pull upon the cable 48. Pull upon the cable 48 will move the carriage outwardly upon the track and the roller will engage the edge of the belt and move the belt toward the outer end of the pulley thus causing the belt to move off of the pulley. When the belt moves off of the pulley it will drop down upon the ground and there will be no danger of it becoming entangled in the pulley since the guard bar 59 will throw the belt outwardly when the belt strikes the guard bar. Therefore, there is no danger of the belt becoming caught in the pulley while in use or when removed. A very efficient belt shifter has therefore been provided.

What is claimed is:

1. In a belt shifter, a track comprising vertically extending supporting bars having upper arms, brackets connected with the lower end portions of the bars and extending beneath the upper arms thereof, bracing rods connecting the outer end portions of the upper arms with the outer end portions of the brackets, rails connected with the upper arms and brackets and extending longitudinally of the frame, a carriage positioned in the frame and having upper and lower rollers engaging the rails, said bracing rods being adjustably connected with the upper arms and supporting brackets to retain the same in proper spaced relation for engagement by said rollers, and means for imparting movement to said carriage.

2. A belt shifter including a track having a frame comprising vertically extending supporting bars having outwardly extending upper arms, upper and lower clamping elements for connecting said bars with a supporting structure including bars extending longitudinally of the track and engaged by the clamping elements, supporting brackets adjacent the lower ends of the vertical bars and connected with the lower portions of the vertical bars for vertical adjustment thereon, rails carried by the upper arms and lower supporting brackets and extending longitudinally of the frame, a carriage positioned in the frame and provided with upper and lower grooved rollers having engagement with the rails, bracing rods extending through openings formed in the outer end portions of the upper arms and lower brackets, and securing nuts carried by said rods and engaging opposite faces of the upper arms and brackets to adjustably connect the rods with the arms and brackets and retain the rails in spaced relation for operative engagement by said rollers.

3. A belt shifter comprising a supporting frame, rails carried by the frame and extending beyond one end thereof, a housing carried by the outer end portions of the rails and extending about the same transversely of the rails, a guide pulley connected with the housing, a carriage slidably mounted in the frame and having rollers engaging the rails, a roller carried by the carriage, and an actuating line extending about the pulley wheel and connected with the carriage for imparting movement to the carriage to extend the roller through the housing and into engagement with a belt to be shifted.

4. The combination with a machine of the character described including a frame, a radiator carried by the frame, a motor including a shaft, and a pulley wheel carried by the motor shaft, of a track including a frame structure connected with the radiator, and rails carried by the frame and extending longitudinally thereof and transversely of the radiator, a carriage slidably mounted between the rails, a belt engaging element carried by the carriage, means for moving the carriage to bring the belt engaging element into engagement with a belt passing about the pulley wheel, and means in operative relation to the pulley wheel for guiding a belt away from the same when moved out of engagement with the pulley wheel.

5. The combination with a machine of the character described including a frame, a power element including a shaft and a pulley wheel mounted upon the shaft, of a track having rails extending transversely of the frame, a carriage slidably mounted upon the track, a roller carried by the carriage and positioned adjacent the pulley wheel for retaining a belt upon the wheel and preventing movement of the belt from the wheel off the inner end thereof, and means for moving the carriage to bring the roller into engagement with the belt to move the belt off the outer end of the pulley wheel.

6. The combination with a power shaft and pulley wheel mounted thereon, of a guard bar extending radially of the wheel from a point adjacent one side thereof to a point beyond the opposite side thereof, means for connecting the bar with the end portion of the shaft, and a support engaging the extended end of the bar to retain the same against pivotal movement.

7. The combination with a rotatable shaft and a pulley wheel mounted thereon, of a stub shaft mounted in the first mentioned shaft, and extending beyond the end thereof, a bearing bracket loosely mounted upon the stub shaft, a guard bar secured intermediate its length to the bearing bracket and extending radially of the pulley wheel, and means for holding the guard bar against pivotal movement.

8. The combination with a shaft and a wheel mounted thereon, of a bearing bracket, a stub shaft for the bearing bracket having connection with the first mentioned shaft to mount the bearing bracket beyond the end of the first mentioned shaft, a guard bar extending radially of the wheel and secured intermediate its length to the bearing bracket, and a securing element carried by a stationary support and having telescoping engagement with one end portion of the guard bar to hold the guard bar against pivotal movement.

In testimony whereof I affix my signature in presence of two witnesses.

WALTER NELSON.

Witnesses:
O. A. TINSETH
DAN. NORDSTROM.